US005715774A

United States Patent [19]

Adey et al.

[11] Patent Number: 5,715,774
[45] Date of Patent: Feb. 10, 1998

[54] ANIMAL FEEDSTOCKS COMPRISING HARVESTED ALGAL TURF AND A METHOD OF PREPARING AND USING THE SAME

[75] Inventors: Walter H. Adey, Gloucester, Va.; Richard Purgason, Sugar Land, Tex.

[73] Assignee: Aquatic BioEnhancement Systems, Sugar Land, Tex.

[21] Appl. No.: 741,646

[22] Filed: Oct. 31, 1996

[51] Int. Cl.$^6$ ..................................................... A01K 61/00
[52] U.S. Cl. ............................................................. 119/230
[58] Field of Search ............................ 119/215–217, 230, 119/231, 221, 223, 224, 226

[56] References Cited

U.S. PATENT DOCUMENTS

| 149,198 | 3/1874 | Clark . | |
|---|---|---|---|
| 3,565,043 | 2/1971 | Carmouche . | |
| 3,726,251 | 4/1973 | Fremont . | |
| 3,773,523 | 11/1973 | Chhuy et al. | 426/167 |
| 4,093,546 | 6/1978 | Taborsky . | |
| 4,144,840 | 3/1979 | Bubien . | |
| 4,169,050 | 9/1979 | Serfling et al. . | |
| 4,297,973 | 11/1981 | Knowles . | |
| 4,333,263 | 6/1982 | Adey . | |
| 4,966,096 | 10/1990 | Adey . | |
| 5,040,486 | 8/1991 | Pack . | |
| 5,046,451 | 9/1991 | Inslee et al. . | |
| 5,097,795 | 3/1992 | Adey . | |
| 5,176,100 | 1/1993 | Fujino . | |
| 5,322,035 | 6/1994 | Hawes et al. . | |
| 5,340,594 | 8/1994 | Barclay | 426/49 |
| 5,352,709 | 10/1994 | Tarrant et al. . | |
| 5,535,701 | 7/1996 | Markels, Jr. | 119/231 |
| 5,547,699 | 8/1996 | Iizuka et al. | 426/615 |

OTHER PUBLICATIONS

E. W. Becker, "Micro–Algae for Human and Animal Consumption", pp. 223–256.

Lincoln, et al, "Aquatic System for Fuel and Feed Production from livestock wastes", *J. Agric. Engng. Res.*, (1986) 33, pp. 159–269.

Adey, et al, *Dynamic Aquaria—Building Living Ecosystems*, Smithsonian Institution, Washington, D.C., pp. 221–246 and 279–369.

*Primary Examiner*—Thomas Price
*Attorney, Agent, or Firm*—Liddell, Sapp, Zivley, Hill & LaBoon LLP

[57] ABSTRACT

A high proteinaceous animal feedstock comprises algae having a solids content between from about 6 to about 95 weight percent. The feedstock is typically prepared by harvesting at least a portion of algal turf from its growing surface and removing water from the severed algal turf until the solids content of the severed algal turf is between from about 6 to about 95 weight percent.

37 Claims, No Drawings

ANIMAL FEEDSTOCKS COMPRISING HARVESTED ALGAL TURF AND A METHOD OF PREPARING AND USING THE SAME

SPECIFICATION

1. Field of the Invention

The invention relates to animal feedstocks comprising harvested algal turf having high protein content and a solids content between from about 6 to about 95 weight percent. The invention further relates to a cost efficient method of producing such feedstocks.

2. Background of the Invention

The last decade has seen an increased commercial interest in aquaculture, and in the production of water-based plants. Microalgae, in planktonic form, have been extensively studied as a possible animal and human food source. Several problems, however, have made it difficult for microalgae to be an acceptable commercially viable foodsource. First, planktonic algae is difficult to harvest. The microscopic size of such algae has severely limited its use. Second, planktonic algae is inherently widely dispersed in the water medium and thus is relatively difficult to dewater prior to drying. Finally, carbon dioxide addition is a significant cost associated with intensive planktonic algal production systems and in many instances is the highest cost component of such systems. While some limited success has been made with the use of Spirulina—a high protein blue-green algae—as a food source, high manufacturing costs make it commercially viable only to consumers who are not cost conscious. Thus, it has not been possible to produce acceptable animal feedstocks characterized by a high solids content without attendant high costs.

A need therefore exists for an algal animal feedstock which may be produced at lower cost than feedstocks derived from planktonic algae. In addition, animal feedstocks having a higher protein content than those typically evidenced by planktonic derived feedstocks are desired. Further, a need exists for new methods of producing animal feedstocks which are more productive and commercially attractive than those methods used in developing feedstocks from planktonic algae.

SUMMARY OF THE INVENTION

The invention relates to an animal feedstock characterized by a protein content of from about 15 to about 85 percent by weight of dry biomass. The feedstock comprising harvested algal turf has a solids content between from about 6 to about 95 weight percent. The feedstock is prepared by subjecting a pre-established, small algal biomass to light, allowing rapid production of the biomass to an algal turf, severing a portion of the algal turf from its growing surface and removing water from the severed algal turf.

DETAILED DESCRIPTION OF PREFERRED EMBODIMENT

The invention relates to an animal feedstock having a protein content of from about 15 to about 85 percent by weight of dry biomass. The protein content of the dry biomass is obtained by multiplying the total nitrogen content of the biomass by 6.25. This is the commercial mode, practiced by agricultural testing services, of establishing protein content. Algae obtains nitrogen from a wide variety of sources including ammonia, nitrite, nitrate, amino acids and urea. The algae absorb these substances from the surrounding water, effectively removing them from the environment by locking them in their tissues.

In a preferred embodiment of the invention, the protein content is in the range of 15 to 70 percent of the dry biomass. In a most preferred embodiment, the protein content is in the range of 35 to 65 percent of the dry biomass.

The feedstock which contains harvested algal turf has a solids content between from about 6 to about 95, preferably about 8 to about 90, weight percent. Depending on the method of harvest, the algal turf may contain between 8 and 25% solids (prior to a dewatering step). The final solids content is dependent upon the dewatering and drying employed to achieve the desired product characteristics. If harvested algae may be used as a livestock or fish feed within a few hours, further drying is not always necessary; however, if it is necessary to transport or feed at a later time, further drying may be desired. Following this drying step the solids content is generally between from about 40, preferably from about 75, to about 95 weight percent. For instance, where the feedstock is to be used as a source of dog food, the solids content is generally between from about 40 to about 60 weight percent. High solids content is often desired in order to conserve transportation costs of the feedstock.

The feedstock is typically prepared in three basic steps; the second and third step being interchangeable in sequence. In the first step, algae is subjected to light while in an aqueous system to produce an algal turf. In the second step, the algal turf is severed before being overgrown by larger macroalgae. Finally in the third step, water is removed from the (severed) algal turf until the solids content of the harvested algal turf is between from about 60 to about 95 weight percent. Alternatively, the algal turf may be removed from the water column, or the water flow interrupted thereby allowing the algae to be dewatered and dried prior to harvest. Severing of the algal turf may then be effected.

Any algae which upon maturation renders an algal turf is suitable for use as the algal source in the invention. The algae may be periphytic algae (typically defined as algae which grows on flowering plants) as well as benthic algae (algae which grows on bottom surfaces). Such algae is commonly freshwater algae though salt water algae is also acceptable. Preferred algae are of the Cyanophyceae, Bacillariophyceae and Chlorophyceae classes, preferably the genera set forth below:

| Cyanophyceae |
|---|
| *Oscillatoria sp.* |
| *Oscillatoria subbrevis* |
| *Oscillatoria princeps* |
| *Anabena sp.* |
| Bacillariophyceae |
| *Navicula sp.* |
| *Nitzschia sp.* |
| *Cyclotella sp.* |
| *Fragillaria sp* |
| *Melosira sp.* |
| *Melosira varians* |
| *Melosira indica* |
| *Amphipieura pellucida* |
| *Eunotia pectinalis* |
| *Cocconeis sp.* |
| *Amphora sp.* |
| *Placoneis sp.* |
| *Rhoikoneis sp.* |
| *Bacillaria sp.* |
| *Ctenophora sp.* |
| *Asterionella sp.* |
| *Stauroneis sp.* |
| *Surirella sp.* |

| Chlorophyceae |
|---|
| *Chlorella sp.* |
| *Scenedesmus sp.* |
| *Closterium sp.* 1 |
| *Chroococcus sp.* |
| *Selenastrum sp.* |
| *Enteromorpha clathrata* |
| *Enteromorpha micrococca* |
| *Cladophora sp.* |
| *Cladophora gracilis* |
| *Cladophora crispata* |
| *Ulothix aegualis* |
| *Ulothrix sp.* |
| *Stigeoclonium sp.* |
| *Stigeoclonium tenue* |
| *Spirogyra rivularis* |
| *Spyrogyra sp.* |
| *Tribonema sp.* |
| *Rhizonclonium sp.* |
| *Hydradictyon sp.* |
| *Microspora sp.* |
| *Pediastrum duplex* |
| *Dichotomosiphon tuberosus* |
| Bangiophycidae |
| *Compsopogon coeruleus* |

Especially preferred are species of the genera Ulothrix, Cladophora, Enteromorpha, Oscillatoria, Navicula, Anabaena and Nitzschia.

Salt water genera may further be used in the production of algal turf for use in the invention. Generally, algae for use in the invention can be grouped into four major areas. They are:

| Green Algae |
|---|
| Bryopsis |
| Derbesia |
| Smithsonia |
| Brown Algae |
| Sphacelaria |
| Giffordia |
| Red Algae |
| Jania |
| Amphiroa |
| Centroceras |
| Polysiphonia |
| Gelidiella |
| Ceramium |
| Herposiphonia |
| Lophosiphonia |
| Blue-Green Algae |
| Oscillatoria |
| Schizothrix |
| Calothrix |
| Microcoleus |

In colder waters, algal turfs are formed by similar or related genera, such as:

| Green Algae |
|---|
| Enteromorpha |
| Ulva |
| Chaetomorpha |
| Chadophora |
| Brown Algae |
| Ectocarpus |
| Giffordia |
| Scytosiphon |
| Red Algae |
| Acrochaetium |
| Ceramium |
| Polysiphonia |
| Blue-Green Algae |
| Oscillatoria |
| Calothrix |
| Diatoms |
| Licmophora |
| Melosira |

The above listings are merely illustrative of some prominent classifications of algae for use in the invention. The more prominent algae, where salt genera are desired, are (1) Sphacelaria, (2) Cladophora, (3) Calothrix, (4) Herposiphonia, (5) Smithsonia and (6) Giffordia.

Ideally, the pH of the water is maintained from about 6.5 to about 10.5, preferably from about 7.5 to about 9.0. Where a more acidic environment is desired, the pH can be lowered by acidifying or bubbling with carbon dioxide. Addition of tannin to the water supply can also be used to foster acidic pH conditions.

The temperature of the water is best maintained between from about 0° C. to about 35° C., preferably between from about 25° C. to about 30° C. In order to maximize the production of the algal turf, it is best to minimize the formation of nitrites. Nitrification of ammonia to nitrite by bacteria may be extremely rapid on the inside of piping walls (generally on the order of 2–6 $gN/m^2/day$ of pipe surface). Ammonia is readily made available in the waste water (optionally from urea and uric acid) as a major source of algal production. Minimizing nitrite-concentration is most desirable in order to maximize ammonia uptake and algal production.

The algal turf for use in the invention may be defined as dense mats of small anatomically simple algae, generally less than several centimeters in height. The tissue production rate of such algal turfs is generally between about 5 to about 40 g dry weight per square meter per day. In a well-developed turf, algae typically absorb 0.3 to 5.0 g nitrogen per square meter of growing surface, though higher and lower levels are known.

Growth of algal turfs can be obtained in an aqueous environment by providing a suitable growing surface upon which the spores may settle and over which water may be passed. The first colonizations are usually microscopic diatoms and blue green algae (cyanobacteria) which are then rapidly dominated by species of the genera listed above. Such algae are principally fresh-water algae.

The growth surface may be located outdoors or indoors. When located outdoors, it may be a man-made or naturally occurring lake or pond or channel. It may also be a tank or vat, especially when located indoors.

The algal biomass grows in the presence of either artificial or natural lighting. When the growth reservoir is located outdoors, the light source is normally the sun. When located indoors, artificial light is used. Metal halide lighting is most efficient where artificial light is desired especially where the algae is nonshaded. Fluorescent lamps can further be used as an effective artificial light source. The algal turfs are lighted for between about 12 to about 22 hours a day.

Algal turfs under lighted and turbulent conditions are efficient scrubbers of carbon dioxide and other nutrients. In so doing, they consume carbon dioxide and bicarbonate ion while releasing oxygen. They further increase the pH of the aqueous system. Under low nutrient conditions, they can be used to fix nitrogen as well as phosphorus. Assuming adequate light is provided, algal production is limited only by inadequate exchange of metabolites—oxygen, carbon dioxide and nutrients—between the water and the cells of the attached algae. Periphytic algae easily attaches to the upper side of growing surfaces.

Suitable growing surfaces for the algal turfs may include screens as well as other well-known surfaces to which benthic algae can attach. Turf algae is preferably grown on fine-mesh plastic screens. Such screens may be produced by being stretched on a frame that fits into the bottom of the tank. A somewhat coarser polyethylene screen, which is considerably more durable, may alternatively be used. The grid dimensions of the screen are such that spores of periphytic algae are allowed to settle. Ideally, such dimensions are in the range of approximately 0.5 to 10 mm, typically around 5 mm. As recited below, such screens may be designed to be removed from the aqueous system. This facilitates harvesting of the turf.

Algal growth is random on the growing surface while wave action passes across and through the turf and enhances metabolite cellular-ambient water exchange. Wave surge dramatically increases algal production and photosynthesis. The net result of this increased photosynthesis and algal production is increased oxygen production and carbon dioxide removal. Wave surge action further enhances the exchange of metabolites between algal cells and the water media. The surge generated by the wave action produces a back and forth motion within the growth reservoir, preventing the development of semi-stagnant boundary layers that occur when a constant flow of liquid passes by a fixed object. (Steady currents tend to pin the filaments in an immobile position and a surface layer of very slow-moving water develops.)

By optimizing such metabolite cellular-ambient water exchange, continuous shading of one cell by an adjacent cell is prevented. Thus, in a preferred embodiment, the periphytic algae is subjected to an oscillatory water surge.

Wave surge or oscillatory water motion can be obtained in a variety of ways, most notably by mechanical wave generators. Such methods of generating wave surge across algal turf is well known in the art. See further the dump-bucket wave maker described in U.S. Pat. No. 4,333,263, herein incorporated by reference. There, water from a pump feeding into the growth reservoir is directed onto the wave generator which comprises a shallow bucket which pivots about its axis. As the bucket fills, the wave generator tips and rotates about its axis such as to cause wave action on the lower growing surface. The action of the wave generator is a function of input water volume and the size of the shallow bucket. An outlet is defined at the opposite end of the growth reservoir. The outlet may be an adjustable spillway to regulate the flow of water in accordance with the pump output.

Wave surge in tanks can further be generated by push boards and large pistons as well as by pneumatic wave drive systems, all of which are well-known in the art. Among the wide variety of pumps available for moving water into tanks, the preferred is the submersible centrifugal pump. In addition, relatively large diameter diaphragm pumps containing "flapper" valves and which alternate relatively slowly from a slight suction to a slight pressure can be employed.

The scrubber is effective in full-salt, brackish and freshwater systems. In effect, the scrubber keeps oxygen near or above the saturation point. The scrubber is most preferably used in conjunction with a means to provide wave surge motion. (In the absence of such a means, a greater surface area is required for algal growth to produce an adequate rate of oxygen production and nutrient uptake.)

Algal turf scrubbers are designed to produce the highest rate of plant production. Typically, shallow troughs create optimal conditions for light and wave surge. Pumps deliver water to the scrubber trough at a rate ranging from about 3 to about 20 gallons a minute per foot of scrubber width. At the other end of the trough, water returns to a reservoir through gravity drain pipes which can be used to supply the wave generator.

Harvesting of (at least a portion of) the algal turf from its growing surface occurs before the turf becomes overgrown by macroalgae. This keeps production at acceptably high levels and prevents predation by grazing microorganisms. Immediate regrowth of the algal turf occurs if the surface or substrate is sufficiently coarse to allow a filamentous base of the algae to remain following severing. Harvesting rates are a function of turf growth which should be monitored.

When a screen is used as a growing surface, harvesting may be accomplished simply by removing the screen and scraping away the excess growth. The scraper is a plastic device such as an automobile windshield ice scraper or a razor blade. This procedure effectively removes nutrients from the system by collecting nitrogen, phosphorus and carbon that has become incorporated into the algal biomass. The basal filaments that remain intertwined in the mesh of the screen after scraping quickly send up new growth to replace what has been removed.

Harvesting may further be accomplished by allowing fish or livestock to graze the algae directly from its growth surface. Such harvesting techniques renders the dewatering step to be unnecessary.

The algal turf can be harvested further by hand or utilizing machinery. Harvesting can be effectuated by employing stepped sluiceways. A surge generator of the type disclosed in U.S. Pat. No. 4,333,263 can be positioned at various step levels to translate the laminar water flow of a stream into surge motion without requiring external energy input. Harvesting of the algal turf is then accomplished by momentarily interrupting the flow and raking the screens by livestock, fish, hand or machinery.

The algal biomass may be severed and harvested prior to the removal of the water to render the designated solids content. Alternatively, the algal biomass may be severed and harvested subsequent to the water removal.

Harvest frequency is a function of flow rate, size of the growing surface and lighting intensity and duration. Optimum harvest frequency generally ranges from about 5 to about 20 days.

The removal of water from the severed algal biomass may occur by evaporation techniques well-known in the art. Once removed, the solids content of the severed algal biomass is between from about 6 to about 95 weight percent.

Using the methodology described herein, approximately 50 mg of dry algae/$m^2$/day Langley of available light can be produced. Biomass yield can be elevated to at least 100 mg/$m^2$/day/L if the system is configured so as to cause pH elevation (due to the removal of $CO_2$ and $HCO_3$ in photosynthesis) and precipitation of phosphorus, calcium, magnesium, and iron onto the cell walls of the algae. If organic particulates are present, trapping of those particulates by the algae can further elevate apparent biomass yield.

The entire process of the invention may be conducted without the addition of salts or other chemical agents.

Since the major expense in animal production is in feed sources, the feedstocks of the invention provide a high quality protein supplement and may be used to replace conventional soybean based feedstocks. The feedstock is suitable for use for animals and fish. Most notably, the feedstock is useful for livestock such as poultry, swine or cattle and such fish as Tilapia sp. and eels.

In one embodiment of the invention, the immature animals or fish may be introduced to the algal biomass directly, thereby rendering manipulative severance of the algal turf unnecessary. In other words, grazing of the animals (or fish) results in severance of the algal turf from its growing surface. The algal turf is preferably one containing the genera Ulothrix, Cladophora, Enteromorpha, Oscillatoria, Navicula, Anabaena, Nitzschia, Sphacelaria, Calothrix, Herposiphoria, Smithsonia or Giffordia.

The invention will be more clearly illustrated with reference to the following examples.

EXAMPLE 1

A growth surface was constructed by grading earth to a slope of at least 0.5%. A plastic sheet was then placed over the graded earth with the sides bound such that water could not spill off the sides but instead ran lengthwise down the slope. A plastic screen could then be attached to the plastic sheet on the upper side. The screen addition is optional, but serves to prevent sloughing of algae which may otherwise slip along the plastic surface. At the head portion of the growth trough water was introduced in a method previously described in U.S. Pat. No. 4,333,263, such that water surged onto the growth trough. Algal spores were then randomly scattered on top of the growth surface to seed the system.

A harvester traversed the growth surface and lifted the algal biomass off the surface and deposited it into a receiving hopper. The hopper was emptied periodically.

EXAMPLE 2

A growth surface was constructed by grading earth to a slope of at least 0.5%. A plastic sheet was then placed over the graded earth with the sides bound such that water could not spill off the sides but instead could run lengthwise down the slope. A plastic screen could then be attached to the plastic sheet on the upper side. The screen addition is optional, but serves to prevent sloughing of algae which may otherwise slip along the plastic surface. At the head portion of the growth trough water was introduced in a method previously described in U.S. Pat. No. 4,333,263, such that water surged onto the growth trough. Algal spores were then randomly scattered on top of the growth surface to seed the system. The foot of the growth surface contains a screening device commonly called a wedgewire screen.

Harvest Option A:

A harvester traverses the growth surface in a manner that severs the biomass with a squeegee-like manner. This may be performed with the water flowing or with water stopped. Algae is moved down the growth surface to the screen by action of the squeegee harvester or by movement of the water if harvesting is performed with water flow. Harvested algae is separated from the water by the gentle action of the wedgewire screen which may be oriented across the bottom edge of the growth surface or oriented within the stream of a collecting trough. In this manner the algae is collected.

Harvest Option B:

A harvester traverses the growth surface in a manner that severs the biomass with a shaving-like manner without interrupting water flow. This may best be performed during sunlight to ensure the algae will float. Algae is moved down the growth surface to the screen by action of the water flow. Harvested algae is separated from the water by the gentle action of the wedgewire screen which may be oriented across the bottom edge of the growth surface or oriented within the stream of a collecting trough. In this manner the algae is collected.

EXAMPLE 3

A growth surface was constructed by grading earth to a slope of at least 0.5%. A plastic sheet is then placed over the graded earth with the sides bound such that water may not spill off the sides but instead runs lengthwise down the slope. A plastic screen is then placed over but not attached to the plastic sheet on the upper side. The screen is weighted down such that it is held onto the screen in any number of ways, one of which is to place a heavy cable, usually lengthwise in the direction of slope. At the head portion of the growth trough water is introduced in a method previously described in U.S. Pat. No. 4,333,263, such that water surges onto the growth trough. Algal spores are then randomly scattered on top of the growth surface to seed the system.

When it is time to harvest, the screen may be removed by lifting the weight that holds the screen down. The screen may then be pulled off the plastic liner and further handled in various permutations of activity a. The algae can be harvested immediately by scraping the surface and collecting the algae after which the screen may be replaced on the plastic liner;

b. The screen can be placed within an area where livestock or fish are allowed to graze the algae from the screen. After sufficient grazing the screen may be replaced back on the plastic liner.

c. The screen may be placed within a drying structure to dry the algae prior to detachment. Following drying, the screen may then be scraped to remove the algae and replaced back onto the plastic liner.

EXAMPLE 4

Fish or livestock may be allowed access to the growth surface in any of Examples 1–3 to effect harvest without manual removal of the algae. When sufficient algae has been removed, the fish or livestock may then be herded onto or into another growth surface region for subsequent further harvest. In any event, care must be taken to prevent placement of an animal with footing which may damage an insufficiently durable plastic sheet.

From the foregoing, it will be observed that numerous variations and modifications may be effected without departing from the true spirit and scope of the novel concepts of the invention.

What is claimed is:

1. A feedstock comprising harvested algal turf within the genus Ulothrix, Cladophora, Enteromorpha, Oscillatoria, Navicula, Anabaena, Nitzschia, Sphacelaria, Calothrix, Herposiphoria, Smithsonia and Giffordia and having a solids content between from about 6 to about 95 weight percent and a protein content of from about 15 to about 85 percent of the dry biomass.

2. The feedstock of claim 1 wherein the algal turf is of the genus Ulothrix, Cladophora, Enteromorpha, Oscillatoria, Navicula, Anabaena or Nitzschia.

3. The feedstock of claim 2 wherein the solids content is between from about 75 to about 95 weight percent.

4. The feedstock of claim 2 wherein the solids content is between from about 40 to about 60 weight percent.

5. A method of producing fish from a high proteinaceous feedstock which comprises feeding to immature fish the feedstock of claim 2.

6. The method of claim 5 wherein the protein content of the high proteinaceous feedstock is between from about 30 to about 70 weight percent by weight of the dry biomass.

7. The method of producing fish from a high proteinacious feedstock which comprises feeding to immature fish the feedstock of claim 6.

8. A method of raising livestock on a high proteinaceous feedstock which comprises feeding the said livestock the feedstock of claim 2.

9. The method of claim 8 wherein the solids content of the high proteinaceous feedstock is between from about 75 to about 95 weight percent.

10. The method of claim 8 wherein the protein content of the high proteinaceous feedstock is between from about 30 to about 70 percent by weight of the dry biomass.

11. The feedstock of claim 1 wherein the protein content is between from about 30 to about 70 percent of the dry biomass.

12. A method of producing fish from a high proteinaceous feedstock which comprises feeding to immature fish the feedstock of claim 1.

13. A method of raising livestock on a high proteinaceous feedstock which comprises feeding to said livestock the feedstock of claim 1.

14. A feedstock comprising harvested algal turf from the class Bacillariophyceae, Chlorophyceae and Bangiophycidae and having a solids content between from about 6 to about 95 weight percent and a protein content of from about 15 to about 85 weight percent of the dry biomass.

15. The feedstock of claim 14, wherein the solids content is between from about 75 to about 95 weight percent.

16. The feedstock of claim 14, wherein the solids content is between from about 40 to about 60 weight percent.

17. The feedstock of claim 14, wherein the protein content is between from about 30 to about 70 percent of the dry biomass.

18. A method of producing fish from a high proteinacious feedstock which comprises feeding to immature fish the feedstock of claim 14.

19. A method of raising livestock on a high proteinaceous feedstock which comprises feeding to said livestock the feedstock of claim 14.

20. The method of claim 19 wherein the solids content of the high proteinaceous feedstock is between from about 75 to about 95 weight percent.

21. The method of claim 19 wherein the protein content of the high proteinaceous feedstock is between from about 30 to about 70 percent by weight of the dry biomass.

22. A method of preparing an animal feedstock which comprises:
(A) subjecting algae to light in an aqueous system for a time sufficient to produce an algal turf;
(B) severing at least a portion of the algal turf from its growing surface;
(C) removing water from the severed algal turf until the solids content of the severed algal turf is between from about 6 to about 95 weight percent; and
(D) recovering the semi-solid severed algae.

23. The method of claim 22 wherein the severed algal turf of step (B) is harvested prior to water removal step (C).

24. The method of claim 23 wherein the growing surface for the algal turf is a filter screen.

25. The method of claim 22 wherein the severed algal turf is harvested subsequent to water removal step (C).

26. The method of claim 22 wherein the algae of step (A), to which the light is subjected, is attached to the upper side of a growing surface.

27. The method of claim 22 wherein the algae is subjected to an oscillatory water surge.

28. The method of claim 22 wherein the solids content of the severed algal turf of step (C) is between from about 8 to about 55 weight percent.

29. The method of claim 28 wherein the solids content of the severed algal turf of step (C) is between from about 8 to about 35 weight percent.

30. The method of claim 29 wherein the solids content of the severed algal turf of step (C) is between from about 8 to about 20 weight percent.

31. A method of producing fish from a high proteinaceous feedstock which comprises:
(A) subjecting algae to light in an aqueous system for a time sufficient to produce an algal turf wherein the algae is of the genus Ulothrix, Cladophora, Enteromorpha, Oscillatoria, Navicula, Anabaena, Nitzschia, Sphacelaria, Calothrix, Herposiphoria, Smithsonia or Giffordia;
(B) introducing immature fish to the algal turf for a time sufficient for the fish to graze on the algal turf until the fish are mature; and
(C) separating the mature fish from the algal turf.

32. The method of claim 31 wherein the algal turf is of the genus Ulothrix, Cladophora, Enteromorpha, Oscillatoria, Navicula, Anabaena or Nitzschia.

33. A method of raising livestock on high proteinaceous feedstock which comprises:
(A) subjecting algae to light in an aqueous system for a time sufficient to produce an algal turf wherein the algae is of the genus Ulothrix, Cladophora, Enteromorpha, Oscillatoria, Navicula, Anabaena, Nitzschia, Sphacelaria, Calothrix, Herposiphoria, Smithsonia or Giffordia;
(B) introducing immature livestock to the algal turf for a time sufficient for the livestock to graze on the algal turf until the livestock are mature; and
(C) separating the mature livestock from the algal turf.

34. The method of claim 33 wherein the algal turf is of the genus Ulothrix, Cladophora, Enteromorpha, Oscillatoria, Navicula, Anabaena or Nitzschia.

35. A method of preparing an animal feedstock which comprises:
(A) subjecting algae to light in an aqueous system for a time sufficient to produce an algal turf;
(B) dewatering the algal turf until the solids content of the algal turf is between from about 6 to about 95 weight percent;
(C) severing at least a portion of the algal turf from its growing surface; and
(D) recovering the semi-solid severed algae.

36. The method of claim 35 wherein the algae is subjected to an oscillatory water surge.

37. The method of claim 35 wherein the growing surface for the algal turf is a filter screen.

* * * * *